(12) United States Patent
Tegland (10) Patent No.: US 7,854,512 B2
(45) Date of Patent: Dec. 21, 2010

(54) APPARATUS FOR MOUNTING MOTION PICTURE CAMERA EQUIPMENT

(76) Inventor: Skyler M Tegland, 2714 11th St., Santa Monica, CA (US) 90405

( * ) Notice: Subject to any disclaimer, the term of this patent is extended or adjusted under 35 U.S.C. 154(b) by 973 days.

(21) Appl. No.: 11/677,584

(22) Filed: Feb. 22, 2007

(65) Prior Publication Data

US 2008/0205876 A1  Aug. 28, 2008

(51) Int. Cl.
*G03B 17/00* (2006.01)
(52) U.S. Cl. .................. 352/243; 248/298.1; 248/187.1; 348/373
(58) Field of Classification Search .................. 352/243; 348/373, 375, 376; 248/424, 429, 244, 298.1, 248/657, 177.1, 178.1, 187.1
See application file for complete search history.

(56) References Cited

U.S. PATENT DOCUMENTS

| 3,598,355 | A | * | 8/1971 | English | 396/428 |
| 4,409,860 | A | * | 10/1983 | Moriyama et al. | 74/490.09 |
| 4,729,536 | A | * | 3/1988 | Scala | 248/429 |
| 7,488,126 | B2 | * | 2/2009 | Gonzales | 396/423 |
| 2006/0124814 | A1 | * | 6/2006 | Gonzales | 248/298.1 |
| 2006/0231719 | A1 | * | 10/2006 | Kayumi et al. | 248/429 |
| 2006/0255582 | A1 | * | 11/2006 | Kawasaki et al. | 280/801.1 |
| 2007/0114355 | A1 | * | 5/2007 | Koumura | 248/429 |
| 2007/0176072 | A1 | * | 8/2007 | Ikegaya et al. | 248/429 |

* cited by examiner

*Primary Examiner*—William C Dowling (57) ABSTRACT

A positioning device for motion picture camera equipment. The positioning device includes a plurality of modular longitudinal rails, a camera mounting plate, means for slidably positioning said plate along said rails, means for joining said rails to form a suitable platform for positioning said plate.

14 Claims, 7 Drawing Sheets

APPARATUS FOR MOUNTING MOTION PICTURE CAMERA EQUIPMENT

BACKGROUND

1. Field of Invention

This invention relates generally to the field of photography, and specifically to a positioning system for motion picture camera equipment.

2. Terminology

For the purpose of this discussion, certain terminology specific to the motion picture industry will be defined and referred to throughout.

Mitchell Mount: Standard within the American motion picture industry is a method of mounting a camera or camera head to a support platform which employs a male threaded stud of 2.75 inches in diameter, a corresponding aperture on the support media (tripod, dolly, etc.), and a female nut. The entire system is referred to collectively as a "Mitchell mount." The male threaded stud is termed a "male Mitchell screw," the aperture is termed the "female Mitchell mount" and the nut is a "Mitchell nut" or "tie down."

Camera Dolly: a rolling platform which allows for the positioning of the camera.

Dolly Grip: This term is applied to the technician who is responsible for mounting the camera to the dolly and positioning the camera dolly while filming.

Composition: This refers to the elements within the film frame and how they are arranged spatially.

Slider: A linear track and bearing system used to position a camera while filming.

Speedrail®: Aluminum tubing of uniform diameter and the associated cast aluminum fittings which together are used to form structures suitable to supporting motion picture equipment.

Cheeseplate: Aluminum plate of various sizes which has been provided with a grid of ⅜ths inch diameter through holes drilled on 1 inch centers. These plates are used in conjunction with Speedrail® to mount camera and lighting equipment in many situations.

3. Description of Related Art

For artistic effect or simply to maintain desired frame composition, a motion picture camera must be able to move smoothly while filming. Historically, this requirement has been met by mounting the camera to a camera dolly which is in turn positioned by the dolly grip. The dolly grip acts under the direction of the camera operator, who views the frame composition through the camera's viewfinder.

Several problems arise when using such an arrangement. Principal among these is the fact that the operator has no direct control over the camera position and must rely on the dolly grip's judgment and intuition. The dolly grip usually has no means for viewing the frame composition directly, so he may be unaware if an undesirable situation arises; the obscuring of one actor by another, for example. Verbal communication between the dolly grip and the operator is considered disruptive to the actors' performance and is frowned upon. Furthermore, the inherent lag time between communication and action may negatively affect the desired result.

To address these issues, the use of a linear track and bearing system, or slider, has achieved great currency. Fundamentally, these sliders are longitudinal camera platforms which mount to the dolly and allow the camera operator to "slide" the camera along a longitudinal axis, thereby maintaining the desired composition of the frame without reference to the dolly. These sliders are constructed of commercially available linear rails bolted to aluminum plates or u-shaped channels. The camera mount is then provided with recirculating linear bearings which are sliceable along the linear rails. Means for attaching the base of the slider to the dolly is provided, usually in the form of a male Mitchell screw.

Although a useful tool, the slider in its accepted configuration presents certain difficulties. The linear rails are of fixed length and may not be adjusted. If a slider is found to be too short to provide the desired movement or too long to fit within the confines of the set, a completely different slider is required. Production companies therefore will rent or otherwise acquire more than one unit to cover the needs of the camera operator, incurring unwanted expense.

Another difficulty associated with the slider is its reliance on the dolly for support. The dolly is itself heavy and cumbersome in the tight quarters where a slider's usefulness is most appreciated.

A third difficulty concerns the accepted method of manufacture of the slider and the volume of expensive machining operations required to produce a slider. Inherent in the prior art is a large planar surface to which the linear rails are fixed. The majority of material in this plane serves no useful purpose as it does not contribute to the rigidity of the structure. This unwanted dead weight material is sometimes removed using a computerized milling machine or other means, but such operations are expensive. Furthermore, extensive drilling and tapping operations are required to provide suitable means for bolting of the linear rails to the aluminum body. These processes add considerably to the cost of production.

SUMMARY

In accordance with one embodiment a camera positioning system comprising a camera mount, a supporting base, a plurality of longitudinal supports provided with T-slot apertures and corresponding fasteners, means for slidably positioning the camera mount, and means for selectably securing the support base.

DRAWINGS

The present invention will be readily understood by those having skill in the relevant art by the following detailed description in conjunction with the accompanying drawings.

REFERENCE NUMERALS

Figure 4:
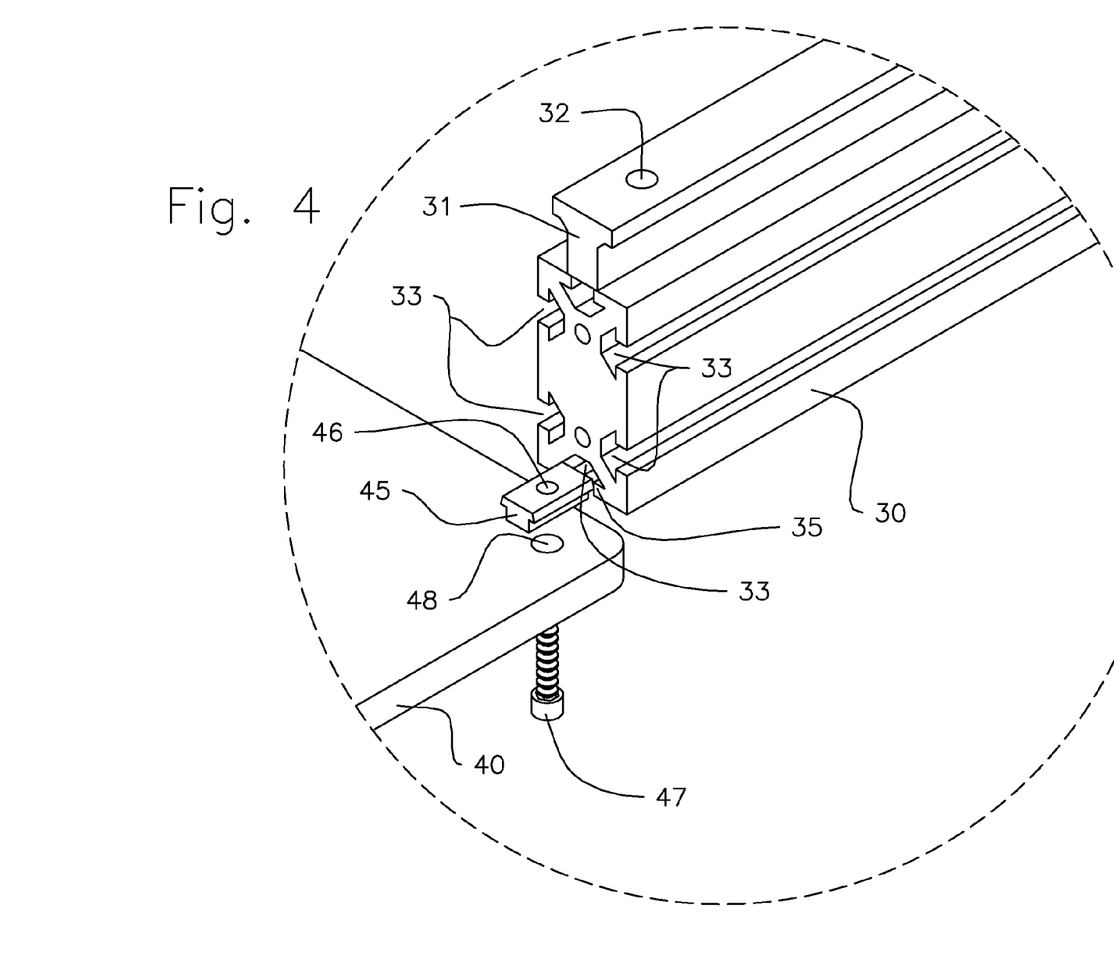
FIG. 4 is an enlarged view of the enlargement window 4 illustrated in FIG. 3.

| 4 | Enlargement window of FIG. 4 |
|---|---|
| 20 | Latitudinal support |
| 21 | Mounting screw |

-continued

| | |
|---|---|
| 22 | Aperture |
| 23 | Cheeseplate aperture |
| 24 | Handle aperture |
| 25 | T-nut clearance aperture |
| 26 | Cheeseplate hole pattern |
| 30 | Longitudinal support |
| 30A | Alternate longitudinal support |
| 31 | Linear rail |
| 31A | Alternate linear rail |
| 32 | Through hole |
| 33 | Longitudinal aperture |
| 34 | Threaded hole |
| 35 | Lip |
| 40 | Support base |
| 41 | Mitchell screw |
| 42 | Cap screw |
| 43 | Through hole |
| 44 | Threaded hole |
| 45 | T-nut |
| 46 | Threaded hole |
| 47 | T-nut screw |
| 48 | Aperture |
| 50 | Camera mount |
| 51 | Linear bearing |
| 52 | Female Mitchell mount aperture |
| 53 | Keyway |
| 60 | Leg mount |
| 61 | Support leg |
| 62 | Vertical adjustment screw |
| 63 | Leg aperture |
| 64 | Longitudinal adjustment screw |
| 70 | Joint |
| 80R | Right-hand stop |
| 80L | Left-hand stop |
| 81R | Thumbscrew |
| 81L | Thumbscrew |

DETAILED DESCRIPTION OF A PREFERRED EMBODIMENT

While the invention is susceptible to various modifications and alternative forms, specific embodiments thereof have been shown by way of example in the drawings and will herein be described in detail. It should be understood, however, that the detailed description is not intended to limit the invention to the particular forms disclosed. On the contrary, the intention is to cover all modifications, equivalents, and alternatives falling within the spirit and scope of the invention as defined by any claims filed in this application or any related non-provisional patent application.

Figure 1:
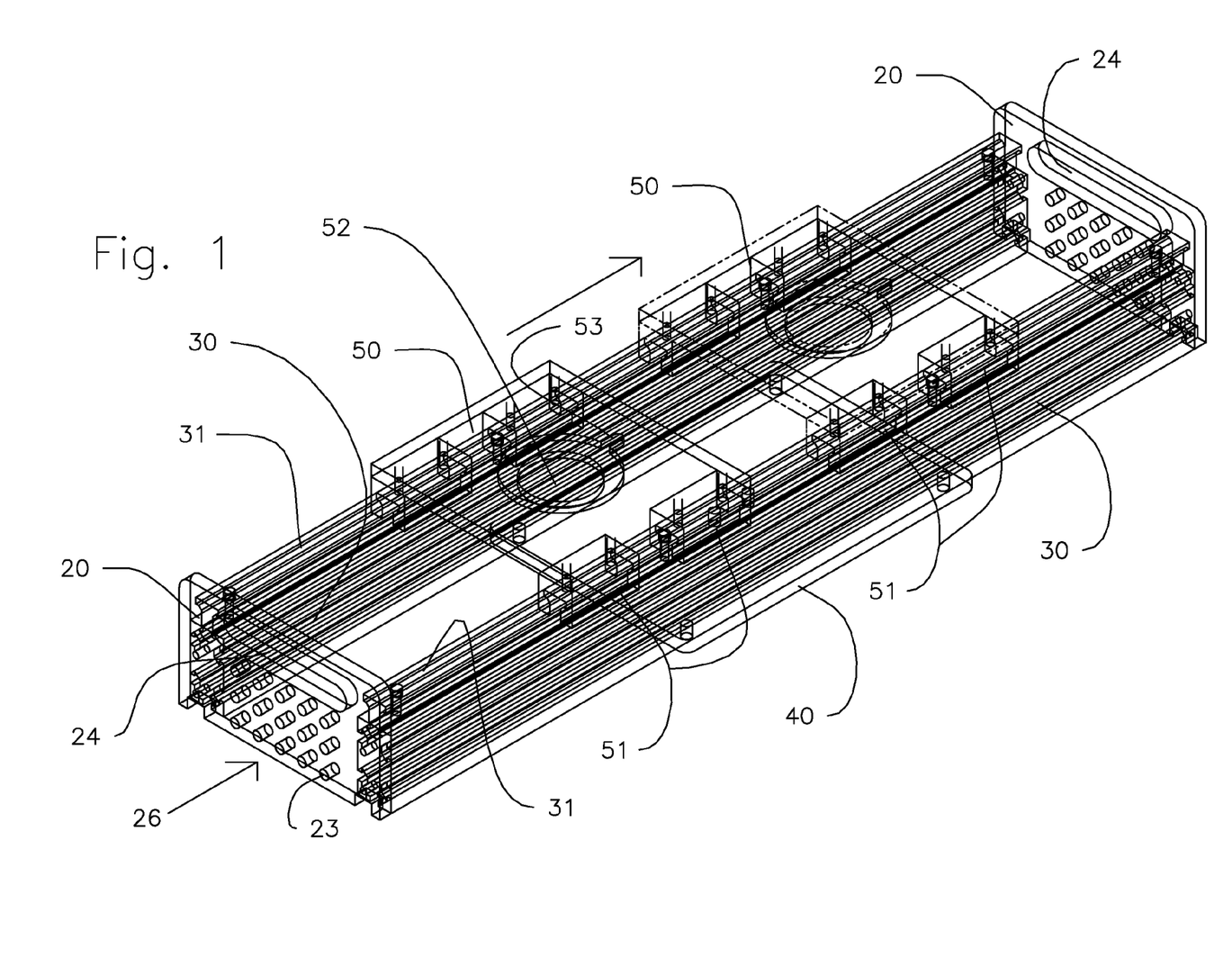
FIG. 1 is a first perspective view of a preferred embodiment of the present showing the slidable camera mount.

As illustrated in FIG. 1, the present invention provides a slidable camera mount 50 to which motion picture cameras may be suitable mounted by way of a female Mitchell mount aperture 52. A standard keyway 53 is also provided to prevent unwanted rotation of the mounted equipment. The camera mount 50 is attached to linear bearings 51 which ride on linear rails 31. Latitudinal supports 20 in conjunction with support base 40 keep the longitudinal supports 30 in parallel. Latitudinal supports 20 are also positioned so as to capture the camera mount 50 in such a way that it may not slide free of the linear rails 31. A handle aperture 24 is provided for the convenience of the technician in mounting the present invention. Furthermore, a cheeseplate hole pattern 26 composed of a grid of cheeseplate apertures 23 is provided, allowing technicians to adapt the present invention to standard support media such as Speedrail®.

Figure 2:
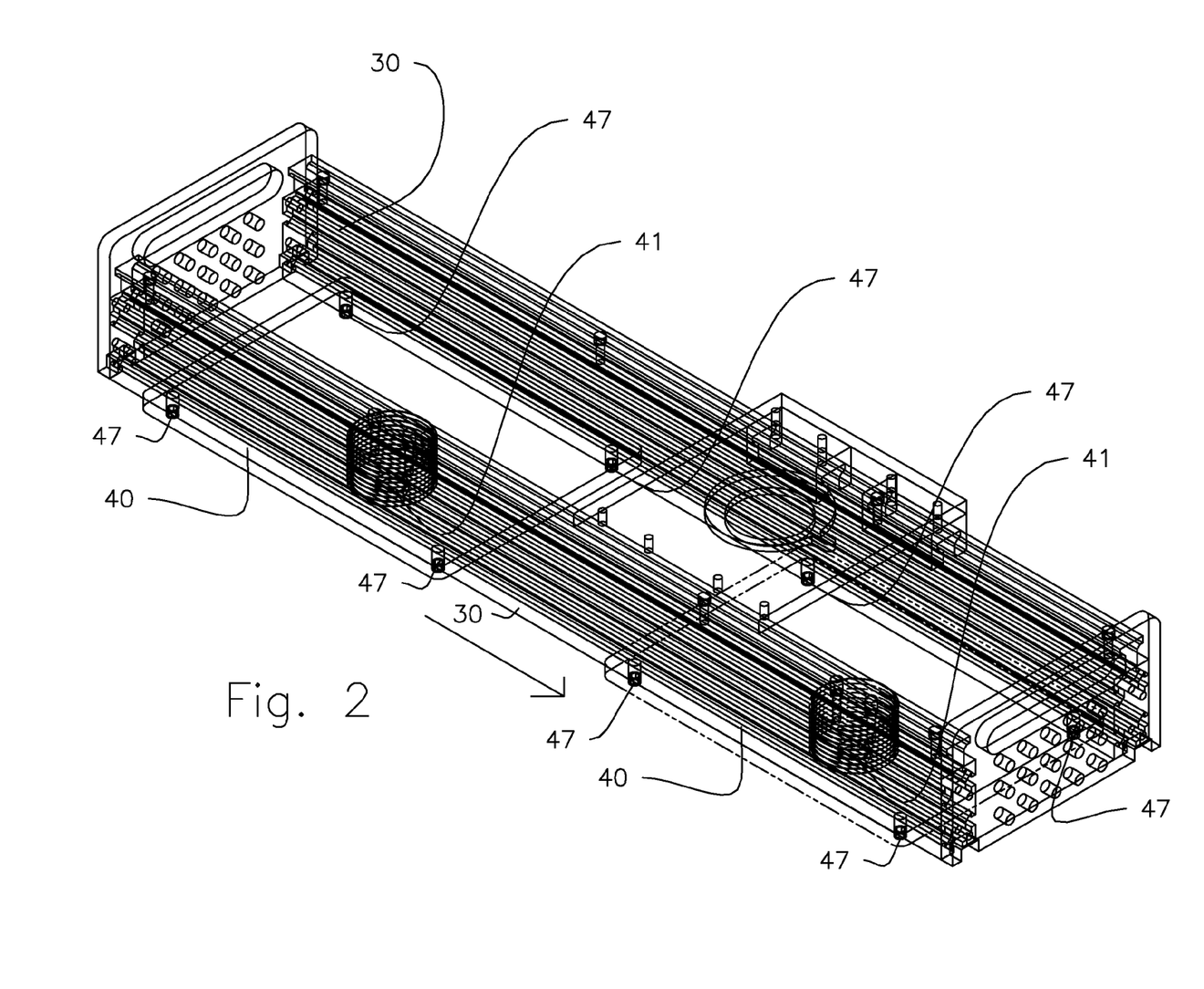
FIG. 2 is a second perspective view of a preferred embodiment of the present invention showing the slidable support base.

As illustrated in FIG. 2, the present invention is provided with a slidable support base 40 and a Mitchell screw 41 for mounting to a variety of support media. T-nut screws 47 secure the support base 40 against the longitudinal supports 30.

Figure 3:
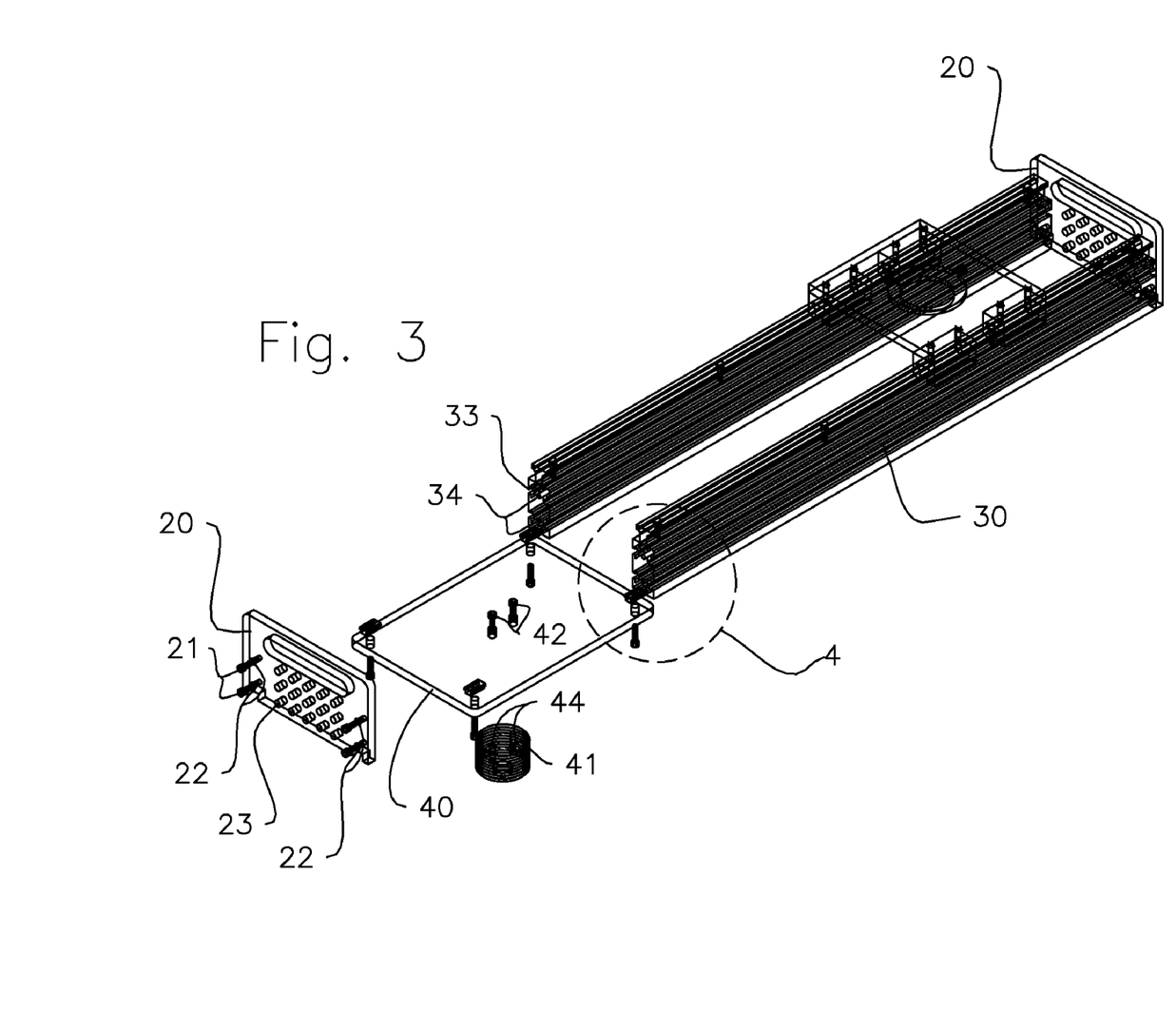
FIG. 3 is a partial exploded view of a preferred embodiment of the present invention.

As illustrated in FIG. 3, the latitudinal support 20 is detachable from the longitudinal supports 30 by removing mounting screws 21 from threaded holes 34, exposing longitudinal apertures 33. Cap screws 42 insertable through apertures 22 and into threaded holes 44 are used to secure Mitchell screw 41 to the support base 40. A number of cheeseplate apertures 23 are provided to the latitudinal support 20 to facilitate mounting the present invention to alternative support media. Window 4 illustrates the enlargement view shown in FIG. 4.

FIG. 4 illustrates an enlarged view of an exploded portion of the present invention derived from enlargement window 4. This view emphasizes the utility of the longitudinal aperture 33 in conjunction with an insertable T-nut 45 and a T-nut screw 47. In FIG. 4, these elements are used to provide means to slidably locate support base 40 in any desired position along the length of longitudinal support 30. A T-nut screw 47 inserted through aperture 48 and threaded into threaded hole 46 may be threadably advanced so as to compress the lip 35 between the T-nut 45 and the support base 40, thereby fixing the position of the support base 40. Through hole 32 provide means for mounting the linear rail 31 to the longitudinal support 30 in a similar manner.

A plurality of longitudinal apertures 33 is illustrated, which, in conjunction with T-nuts and corresponding screws provides means to slidably position a variety of useful accessories like limits and spring stops in the manner described above.

Figure 5:
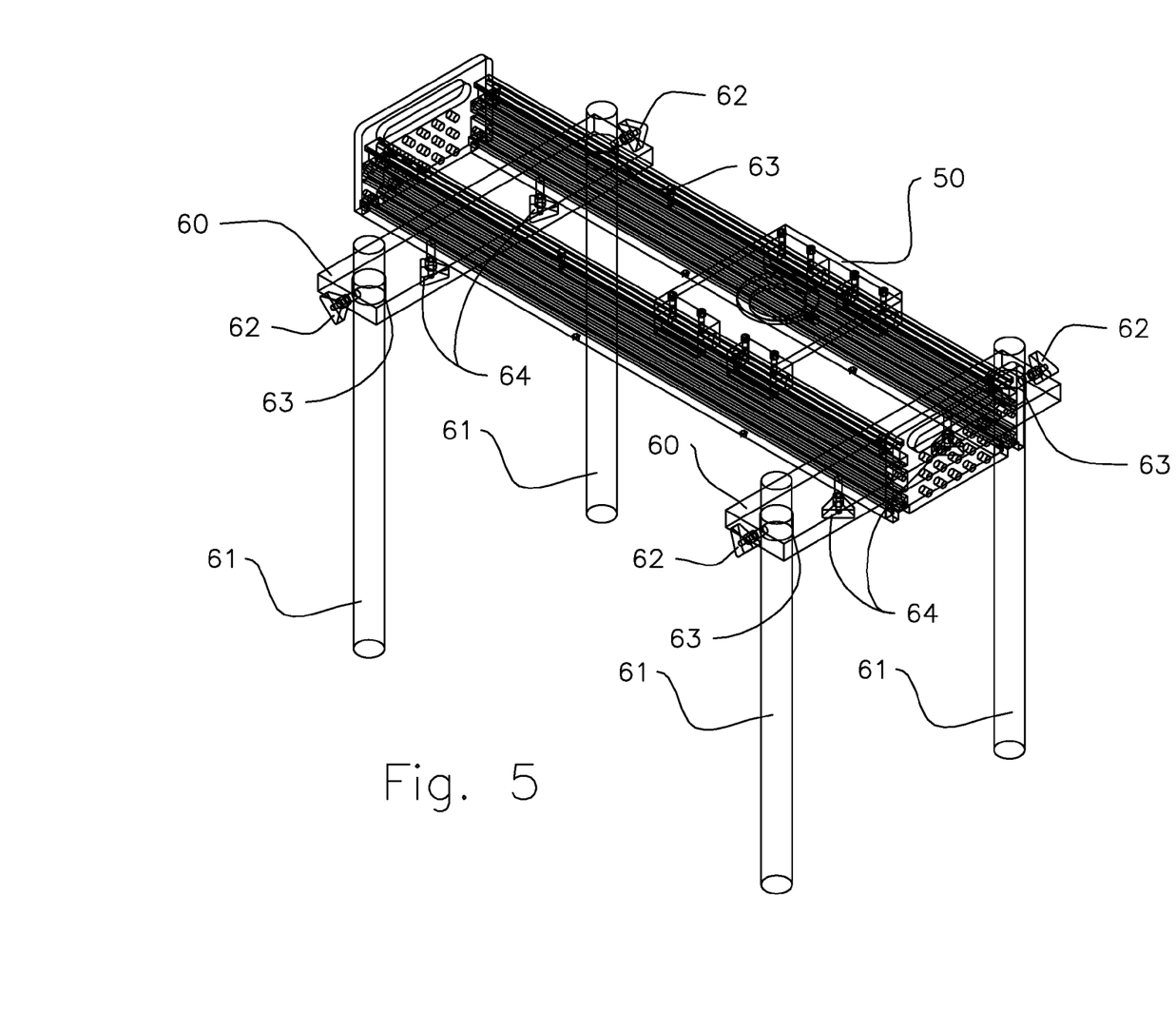
FIG. 5 is a first perspective view of an alternative embodiment of the present invention.

FIG. 5 illustrates an alternative embodiment of the present invention in which leg mount 60 provides means for selectively positioning the height of the camera mount 50. Vertical adjustment screw 62 threadably inserted into leg mount 60 may be applied against support leg 61, securing the position of the support leg 61. The longitudinal position of the leg mount 60 is variable and may be adjusted by means of longitudinal adjustment knob 64 and corresponding T-nuts (not shown) in the manner of the support base 40 described above.

Figure 6:
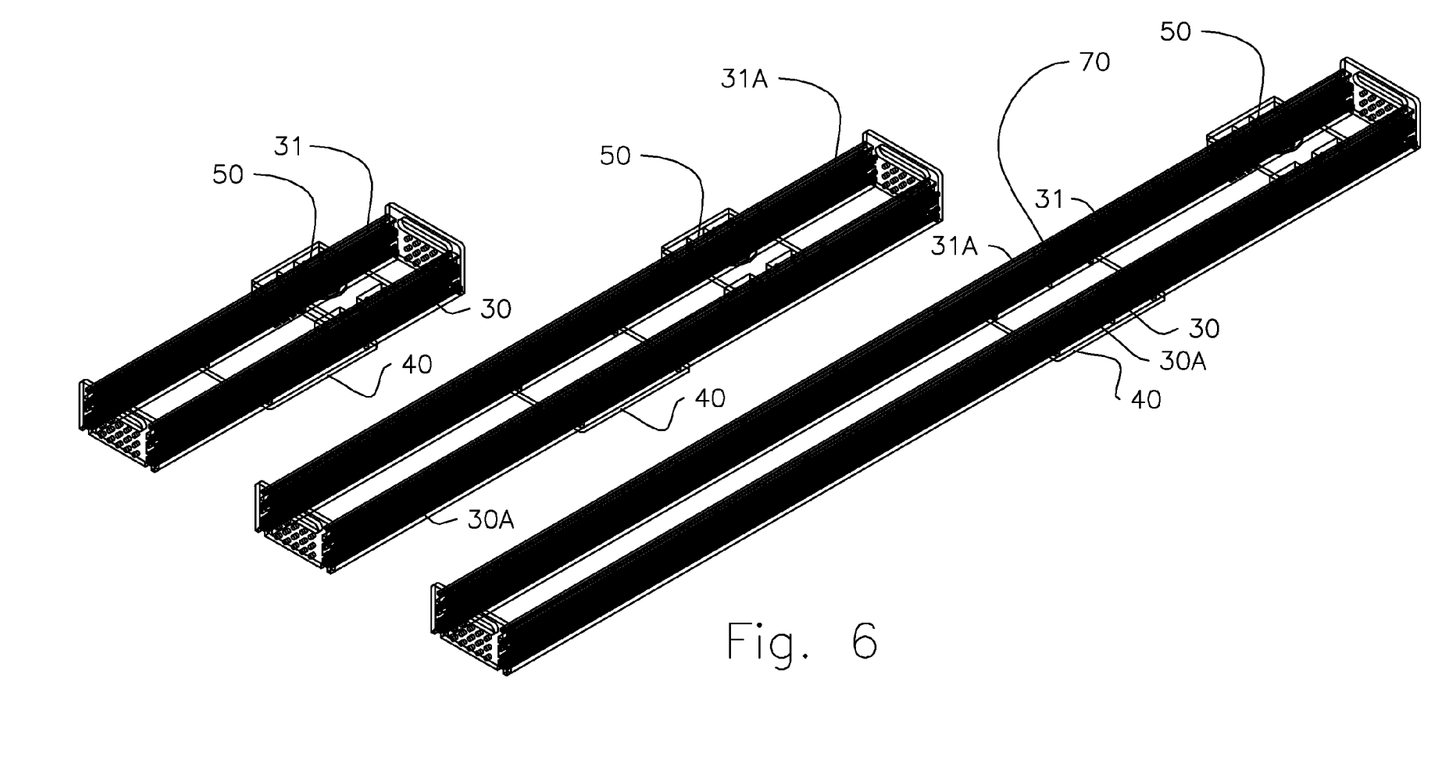
FIG. 6 is a perspective view showing the modular adjustability of the present invention.

FIG. 6 illustrates the advantage of modular construction. From a limited number of separate parts a variety of sliders may be constructed that are suitable to a variety of situations, including the placing of linear rails in series. The joint 70 between linear rails 31 and 31A and longitudinal supports 30 and 31A may be suitably buttressed by support base 40 or other means.

Figure 7:
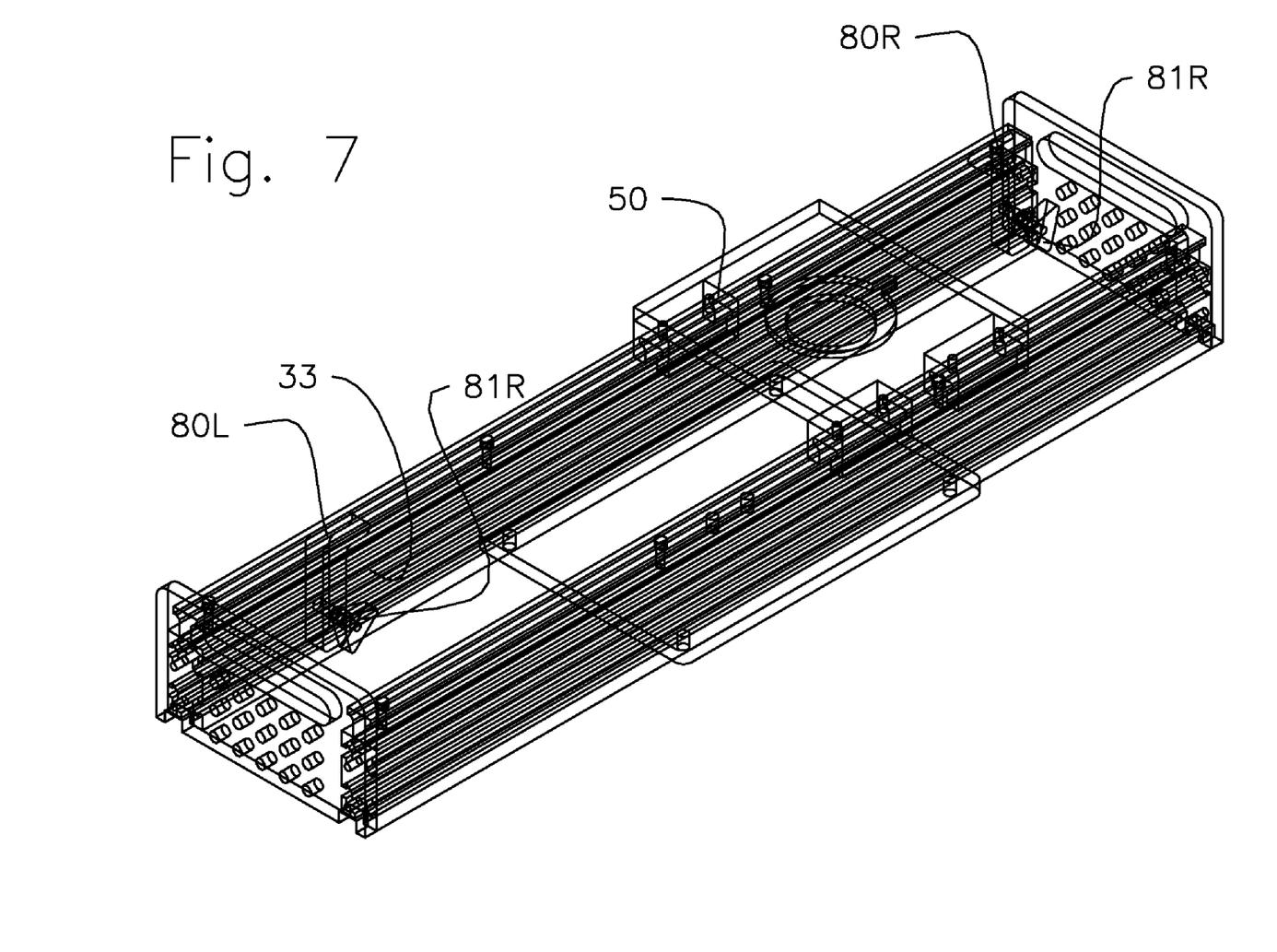
FIG. 7 is a perspective view illustrating slidable stops employed in the present invention.

FIG. 7 illustrates how a variety of useful accessories which are slidably insertable into longitudinal apertures 33 may be positioned and employed. Stops 80L and 80R are positioned using thumbscrews 81L and 81R along the length of longitudinal support 30 by threadably inserting the screws into T-nuts (not shown) which are captured within the longitudinal aperture 33 in the manner described above. These stops restrict movement of the camera mount 50 to the space between the stops.

Operation—FIGS. 1-4

The present invention may be supported by a camera dolly, tripod or other support media via the provided male Mitchell screw 41. Alternatively, any other standard mount such as the Elemak® ball leveling mount or a simple cheeseplate mount would serve as well. A motion picture camera is then secured to the camera mounting plate utilizing the provided female Mitchell mount or other means. The camera operator is then at liberty to position and reposition the camera to maintain composition or meet any other artistic requirement. The linear rails 31 and linear bearings 51 provide essentially frictionless motion. The latitudinal supports 20 keep the camera mount 50 from sliding off the ends of the linear rails 31 and keep the linear rails 31 in parallel.

If, in the course of shooting, it is found that the motion provided by the present configuration is insufficient, the longitudinal supports 30 and linear rails 31 may be exchanged for an alternative set, as illustrated in FIG. 6. Little effort is required to remove the latitudinal supports 20, camera mount 50 and support base 40, as shown in FIGS. 3 and 4. Alternatively, if the present configuration should prove too large for the confines of the set, shorter linear rails 31 and longitudinal supports 30 may be employed.

Operation—FIG. 5

An alternative embodiment of the present invention is illustrated in FIG. 5. In this embodiment, support for the invention is provided by a plurality of support legs 61, the position of which may be adjusted using the vertical adjustment knob 62. The diameter of the supports legs 61 may be made identical to that of the industry standard speedrail® tubing, thereby allowing for an infinite number of mounting possibilities, as well as taking advantage of established equipment and know-how.

Operation—FIG. 7

Although the camera operator controls the motion of the camera mount directly, it is sometimes found useful to further restrict the motion of the camera mount to prevent an undesirable frame composition. Excessive movement in one direction or the other can sometimes allow the camera to "see off the set," for example. FIG. 7 illustrates the use of left and right stops 80R and 80L, which are secured using thumbscrews 81R and 81 L respectively. The camera mount is here restricted to movement between the stops.

Advantages

From the description above, a number of advantages which the present invention enjoys over the prior art become evident:

1. The present invention is modular and variable in length.
2. The present invention may be readily suited to the work environment, its modular construction allowing the technician to determine which pieces are suitable to a particular application and to use only those pieces.
3. The present invention is lighter and more rigid than the prior art, being constructed in such a way as to place material only where it adds to the rigidity of the machine.
4. The preferred embodiment provides means for slidably and selectively positioning a large variety of support media
5. The preferred embodiment provides means for slidably and selectively positioning a variety of useful attachments, such as stops and spring loaded limiting devices.
6. The present invention is inherently cost effective to produce, as many of the expensive subtractive machining processes required by the prior art are herein obviated.
7. The present invention is cost effective to use, as the modular construction obviates the need to buy or rent numerous fixed-length sliders.

Conclusions, Ramifications and Scope

Components of every embodiment of the present inventive system could be manufactured using steel, aluminum alloys, graphite, or reinforced plastics. The variety of the different possibilities of materials would change only the cost and strength of the invention and would not affect the movement of any of the major embodiments herein disclosed.

The present invention therefore provides a novel method and system for positioning a motion picture camera. It will be evident that there are numerous embodiments of the apparatus of this invention which are not described above but which are clearly within the scope and spirit of this system. Although the present invention has been shown and described with respect to preferred embodiments, various changes and modifications lie within the spirit and scope of the claimed invention. Thus, the corresponding structures, materials, acts, and equivalents of all means or step plus function elements in the claims in this patent application or any applications claiming priority therefrom are intended to include any structure, material, or acts for performing the functions in combination with other elements as specifically claimed.

I claim:

1. A mounting system comprising:
   a. a longitudinal axis;
   b. a plurality of longitudinal support structures of predetermined length comprising a plurality of longitudinal apertures defined by a longitudinal recess bordered by a lip;
   c. a plurality of fasteners securable to said longitudinal support structure and slidably insertable into said longitudinal recess and retained by said lip of said longitudinal aperture;
   d. a mounting structure;
   e. a base structure;
   f. means for slidably positioning said base structure along said longitudinal axis;
   g. means for selectively securing the position of said base structure along said longitudinal axis;
   h. means for securing a first longitudinal support structure in parallel to a second longitudinal support structure;
   i. means for slidably positioning said mounting structure along said longitudinal axis.

2. The mounting system of claim 1, wherein said longitudinal recess comprises a substantially T-shaped slot.

3. The mounting system of claim 1, wherein said base structure comprises a threaded male screw of substantially 2.75 inches in diameter, whereby the mounting system may be suitably supported by industry standard receivers.

4. The mounting system of claim 1, wherein said mounting structure comprises an aperture of substantially 2.75 inches in diameter and a slot of substantially ⅜ths inch width, whereby the mounting structure may suitably support an industry standard camera base.

5. The mounting system of claim 1, wherein the means for slidably positioning the mounting structure comprises a plurality of linear rails and a plurality of linear bearings.

6. The mounting system of claim 1, wherein said fastener comprises a female threaded nut.

7. The mounting system of claim 6, wherein the means for slidably positioning said base structure comprises a male threaded fastener that is threadable insertable into said female threaded fastener and can be threadably advanced to bring the fastener into contact with said lip, whereby the relative position of the base structure to the longitudinal support structure may be fixed.

8. The mounting system of claim 6, wherein the means for securing a first longitudinal support in parallel to a second longitudinal support comprises:
   a. a latitudinal axis;
   b. a substantially planar base structure comprising a first aperture and a second aperture, said second aperture being positioned along said latitudinal axis at a predetermined distance from said first aperture;

c. a first male threaded fastener that may be inserted through said first aperture and threadable inserted into said threaded female fastener;

d. a second male threaded fastener that may be inserted through said second aperture and threadable inserted into said threaded female fastener, whereby the positions of the longitudinal supports may be fixed by threadably advancing the male fasteners into the female fasteners.

9. A mounting system comprising:

a. a longitudinal axis;

b. a vertical axis;

c. a plurality of longitudinal support structures comprising a plurality of substantially T-shaped longitudinal slots;

d. a plurality of female threaded fasteners securable to said longitudinal support structure and slidably insertable into said longitudinal recess and retained by said T-shaped longitudinal slots;

e. a plurality of vertical supports;

f. a mounting structure;

g. means for slidably positioning said mounting structure along said longitudinal axis;

h. means for selectively positioning said vertical supports along said longitudinal axis;

i. means for selectively securing said vertical supports in relation to said longitudinal support structure along said vertical axis, whereby the vertical position of the longitudinal support structures may be easily adjusted.

10. The mounting system of claim 9, wherein said vertical support comprises a substantially cylindrical and elongate structure.

11. The mounting system of claim 9, wherein said mounting structure comprises an aperture of substantially 2.75 inches in diameter and a slot of substantially ⅜ths inch width, whereby the mounting structure may suitably support an industry standard camera base.

12. The mounting system of claim 9, wherein the means for slidably positioning said mounting structure comprises a plurality of linear rails and a plurality of linear bearings.

13. The mounting system of claim 9, wherein the means for selectably positioning the vertical supports along the longitudinal axis comprises a male threaded fastener that is threadable insertable into said female threaded fastener.

14. The mounting system of claim 9, wherein the means for selectively securing said vertical supports along said vertical axis is selected from the group consisting of telescopic tubes, compression fittings, cams, rack and pinions, clamps, lead screws, set screws, and pintles and gudgeons.

* * * * *